United States Patent
Bastide et al.

(10) Patent No.: US 11,973,595 B2
(45) Date of Patent: Apr. 30, 2024

(54) RECAST REPETITIVE MESSAGES

(71) Applicant: INTERNATIONAL BUSINESS MACHINES CORPORATION, Armonk, NY (US)

(72) Inventors: Paul R. Bastide, Ashland, MA (US); Matthew E. Broomhall, Goffstown, NH (US); Robert E. Loredo, North Miami Beach, FL (US)

(73) Assignee: International Business Machines Corporation, Armonk, NY (US)

(*) Notice: Subject to any disclaimer, the term of this patent is extended or adjusted under 35 U.S.C. 154(b) by 281 days.

(21) Appl. No.: 17/454,554

(22) Filed: Nov. 11, 2021

(65) Prior Publication Data

US 2022/0069945 A1    Mar. 3, 2022

Related U.S. Application Data

(62) Division of application No. 16/517,762, filed on Jul. 22, 2019, now Pat. No. 11,177,907.

(51) Int. Cl.
| | | |
|---|---|---|
| *H04L 1/08* | (2006.01) | |
| *H04L 1/1809* | (2023.01) | |
| *H04L 1/1867* | (2023.01) | |

(52) U.S. Cl.
CPC .............. *H04L 1/08* (2013.01); *H04L 1/1809* (2013.01); *H04L 1/1887* (2013.01)

(58) Field of Classification Search
CPC ........................................................ H04L 1/08
See application file for complete search history.

(56) References Cited

U.S. PATENT DOCUMENTS

| | | | |
|---|---|---|---|
| 7,143,251 B1 | 11/2006 | Patterson | |
| 9,832,787 B2 | 11/2017 | Broomhall | |
| 2008/0313308 A1* | 12/2008 | Bodin | G06F 16/4387 709/219 |
| 2012/0245925 A1* | 9/2012 | Guha | G06F 40/237 704/9 |
| 2014/0164526 A1 | 6/2014 | Wu | |
| 2015/0052177 A1 | 2/2015 | Roseman | |
| 2015/0081819 A1 | 3/2015 | Wideman | |
| 2016/0127299 A1 | 5/2016 | Bassemir | |
| 2016/0248721 A1 | 8/2016 | Bastide | |
| 2018/0048595 A1 | 2/2018 | Dotan-Cohen | |
| 2018/0227257 A1 | 8/2018 | Banatwala | |
| 2019/0347668 A1* | 11/2019 | Williams | G06N 5/046 |

(Continued)

OTHER PUBLICATIONS

IBM, List of IBM Patents or Patent Applications Treated as Related, Appendix P, dated Nov. 12, 2021, 2 pages.

(Continued)

*Primary Examiner* — Van H Oberly
(74) *Attorney, Agent, or Firm* — Anthony Curro (57) ABSTRACT

A method, computer system, and a computer program product for recasting repetitive messages is provided. Embodiments may include receiving, by a processor, a message. Embodiments may include determining, by the processor, whether the received message is repetitive. Embodiments may include rating, by the processor, an importance level of the received message. Embodiments may include determining a preference for recasting the received message.

16 Claims, 7 Drawing Sheets

(56) References Cited

U.S. PATENT DOCUMENTS

2021/0028887 A1 1/2021 Bastide

OTHER PUBLICATIONS

Mell et al., "The NIST Definition of Cloud Computing", National Institute of Standards and Technology, Special Publication 800-145, Sep. 2011, pp. 1-7.
Sanebox, "What is SaneBox and how does it work?", May 22, 2019, 2 pages, Retrieved from the Internet: < https://www.sanebox.com/help/142-what-is-sanebox-and-how-does-it-work>.

* cited by examiner

Weekly News for the week of 19-NOV-2018 — 402
Weekly News to me (bcc)

— 404

B. <u>Software News</u> — 406
    1. New Software Approved for Use:

| Name | Approved Date | System Type | Intended Use |
|------|---------------|-------------|--------------|
| ABC | 13-NOV-2018 | Remote Access | Use ABC as a remote access tool. |
| XYZ | 13-NOV-2018 | Code Editor | Use XYZ as a code editor for web apps. |

Do you need to take action? [YES/NO] — 408

In summation, ... — 410

I have read this message [YES]. — 412

RECAST REPETITIVE MESSAGES

BACKGROUND

The present invention relates generally to the field of computing, and more particularly to identifying and altering repetitive communications.

Online social networks and collaboration tools may enable a user of an online tool to connect with another user and to share and process information. Some common mechanisms for sharing and processing information may be an email inbox, a text message, an activity stream, and an online profile, among other things. These mechanisms may enable the user(s) to rapidly share information.

With the rapid sharing of information, each user may receive countless messages each day. A user may visually recognize a name, form, title, and/or heading of frequently received messages. These messages, while repetitive or formulaic, may contain useful information.

SUMMARY

Embodiments of the present invention disclose a method, computer system, and a computer program product for recasting repetitive messages. Embodiments may include receiving, by a processor, a message. Embodiments may include determining, by the processor, whether the received message is repetitive. Embodiments may include rating, by the processor, an importance level of the received message. Embodiments may include determining a preference for recasting the received message.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for recasting repetitive messages. As such, the present embodiment has the capacity to improve the technical field of communication services by identifying repetitive messages, rating the level of importance of repetitive messages and by altering the repetitive message's presentation to be less formulaic and less repetitive. A repetitive message, according to various embodiments, may be a message received by a user that contains one or more elements of content that repeat information included in at least one message previously received by the user. More specifically, embodiments may include receiving, by a processor, a message. Embodiments may include determining, by the processor, whether the received message is repetitive. Embodiments may include rating, by the processor, an importance level of the received message. Embodiments may include determining a preference for recasting the received message.

As described previously, online social networks and collaboration tools may enable people to connect with others and to share and process information. Some common mechanisms for sharing and processing information may be an email inbox, a text message, an activity stream, and an online profile, among other things. With the rapid sharing of information, each user may receive countless messages each day. A user may visually recognize a name, form, title, and/or heading of frequently received messages. These messages, while repetitive or formulaic, and thus easily dismissed and/or overlooked, may contain useful information.

As a result, there may be a need to keep important information present and not dismissed. The user may develop a coping mechanism or attention management strategy to prioritize message engagement. A user may receive countless messages each day that may be repetitive or formulaic to other messages received by the user. The user may dismiss or ignore some of the countless messages received each day. As a result, messages containing critical information may be missed by the user. Therefore, it may be advantageous to, among other things, determine whether the received message is repetitive, rate the importance level of the received message, and determine a preference for recasting the received message.

According to at least one embodiment, the present invention may improve communication for the user by enabling the user to avoid missing critical information by analyzing received messages and aggregating historical message data, rating the importance level of a received message and determining the preference for recasting the received message.

According to at least one embodiment, a process may be initiated each time a message is received by the user. A push/pull feed notification may also invoke the process. Push technology may be an internet communication system whereby an information request may be generated by a web server, whereas pull technology may be an internet communication system whereby an information request may be made by a client. Downloading mail from a web browser and/or a web server may be examples of pull technology.

According to at least one embodiment, a method may extract data from a received message. Specifically, the method may extract N-grams from a received message, structure the extracted data using natural language processing (NLP) techniques, identify sections of the extracted data based on color, formatting, and style, and identify elements of the extracted data based on paragraph style and/or headings.

Natural language processing (NLP) techniques may be used by embodiments of the present invention, such as those implemented in Watson™ (Watson and all Watson-based trademarks are trademarks or registered trademarks of International Business Machines Corporation in the United States, and/or other countries) application program interfaces (APIs), and may include, for example, a natural language classifier API (e.g., Watson™ Natural Language Classifier API).

According to at least one embodiment, a method may use natural language processing (NLP) techniques to build a grammar tree (e.g., parse tree) from the extracted data by taking the unstructured data extracted from a received message and putting it in a structured format. The grammar tree (e.g., parse tree) may be an ordered, rooted entity which may represent the syntactic structure highlighting the root of the parse tree to the leaf, a terminal or non-terminal in the context-free grammar. The grammar tree may be used in the analysis of the received message to determine repetitiveness by identifying text with similar intent(s) and/or information.

According to at least one embodiment, message data may be stored in a particular type of database or data structure (e.g., knowledge graph or triple store) associated with the message, and in an embodiment, the database or data structure can be stored using Apache Hadoop® and Apache HBase® (Apache Hadoop and Apache HBase are registered trademarks of the Apache Software Foundation in the United States, and/or other countries) with an Apache Spark™ processing engine, which is a network of computers using certain software. In other embodiments, message data stored in the particular type of database or data structure could be stored in any suitable computer, including but not limited to an Apache Hadoop® (Apache Hadoop is a registered trademark of the Apache Software Foundation in the United States, and/or other countries) system. A knowledge graph may be made up of large networks and/or entities, as well as semantic types, properties, and relationships between entities. A triple store may be a purpose-built database for the storage and retrieval of triples through semantic queries.

According to at least one embodiment, a process may identify repetitive messages, including repetitive sections and elements within the message, by comparing extracted data from a received message to stored historical message data (e.g., data stored in a historical message database such as database 114). The frequency at which natural language elements in the message occur in the historical message data may be determined. Embodiments may determine a frequency score of the received message using a data store (e.g. a lookup table) by referencing the triple store being associated with a table which includes a store of occurrences. The lookup table may be an array that may replace runtime computation with an array indexing operation. A single lookup table may represent the structured data. The determined frequency score may be used to determine a repetitiveness of the extracted data. The frequency score may use any number of statistical techniques to calculate a frequency, a relative frequency, and a standard deviation of the frequency. The triple store may include a counter with the count of occurrences. Historical message data may be useful in identifying repetitive messages and information.

According to at least one embodiment, a user and/or an administrator may set a time period of relevancy (e.g. two weeks, one month) for stored historical message data to remain in the historical message database (e.g., database 114) and to be used in determining whether received messages may be repetitive.

According to at least one embodiment, the level of importance of a received message may be rated using word associations and/or grammar within the message indicating importance (e.g. MUST READ, Action Item) to identify a message of importance.

According to at least one embodiment, the user or the administrator may set a preference for whether the recasting repetitive messages program 110a, 110b may send the received message back to the sender for revision and/or whether the recasting repetitive messages program 110a, 110b may alter the presentation of the received message for the user based on the repetitiveness of the received message and a determined importance.

According to at least one embodiment, the received repetitive message may be sent back to the sender for revision or a customized rendition of the message may be provided for the user, based on a determined preference of the user and/or administrator. The sender may revise the original received message and may make the message less repetitive or may add additional information which may improve communication for the user.

According to at least one embodiment, the received message may be altered to be less formulaic for the user. An alteration may include one or more of a variety of operations. As one example, an alteration may include the addition of a sign off may be injected at the end of the message for a new element, based on a determined importance of the information included in the new element. As another example of an addition, a vote on the new elements in the message may be added to indicate either an agreement and/or a disagreement by the user related to the paragraphs or elements which may be repetitive or altered. As yet another example of an addition, a quiz based on the information that is not formulaic may be added to the altered message. The quiz may be based on repetitive elements in the received message. As further example of an addition, a summarization of the nonrepetitive information may also be included. The summarization may be created by embodiments of the present invention, such as those implemented in Watson™ (Watson and all Watson-based trademarks are trademarks or registered trademarks of International Business Machines Corporation in the United States, and/or other countries) application program interfaces (APIs), and may include, for example, a natural language understanding API (e.g., Watson™ Natural Language Understanding API). The message may be also be altered by splitting the message into two or more sub messages that may be independently delivered. The message may be split into sub messages based on a determined length of the received message and further based on paragraph boundaries in the received message. These sub messages may be independently delivered to the user depending on a determined user and/or administrator preference (e.g. the recipient, administrator, or sender may set a preference). The received message may also be altered by highlighting. The nonrepetitive elements and sections may be highlighted in a presentation layer. The presentation layer may fade out the repetitive layers (i.e., one or more pieces of repetitive information) and may require action before revealing the elements which are repetitive. The addition of alterations which may include a sign off, vote, quiz, summarization, splitting the message into two or more subsections, or highlighting may be beneficial to the user to emphasize information that may otherwise be dismissed or ignored.

According to at least one embodiment, the altered message may be sent to the user after the presentation has been altered.

Figure 1:
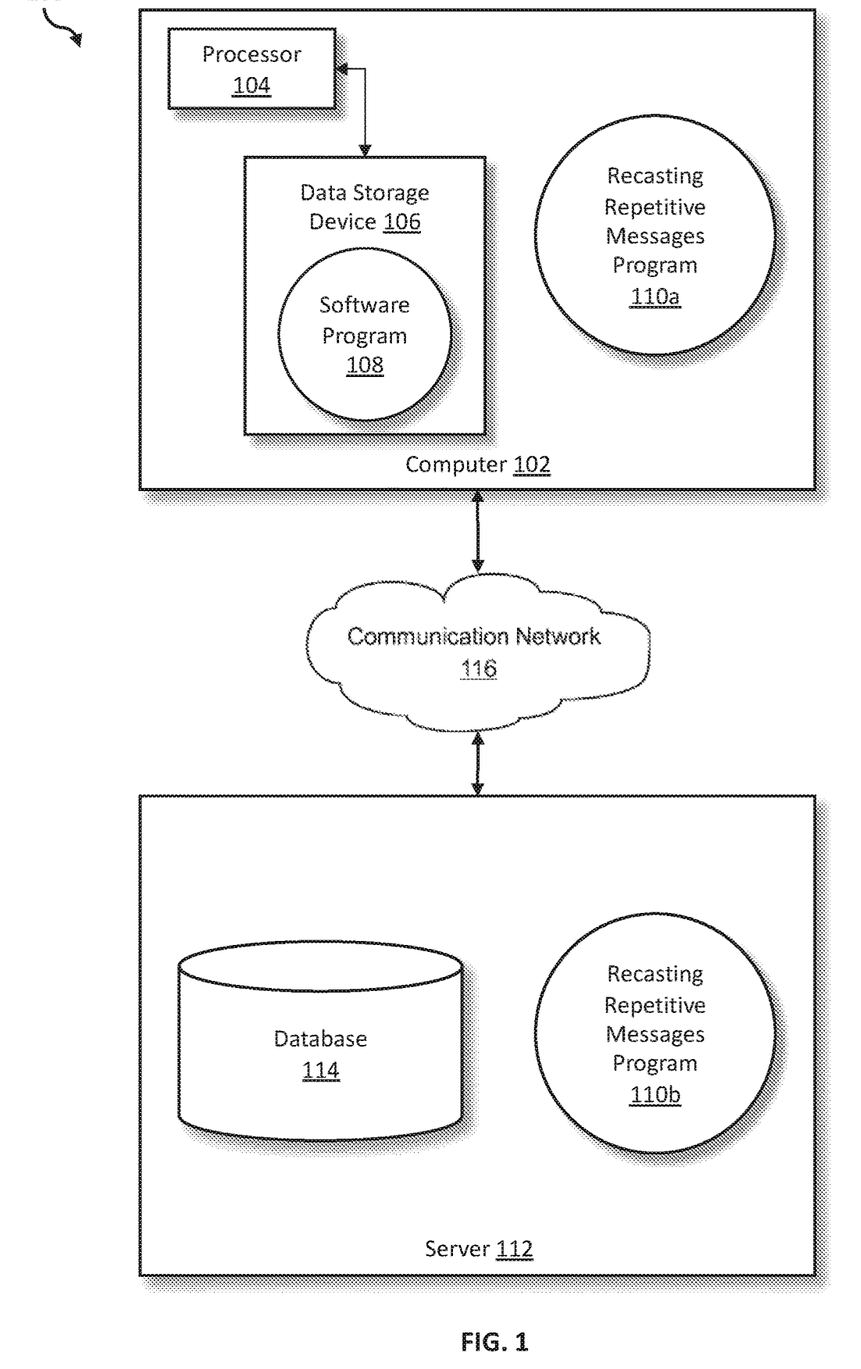
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a recasting repetitive messages program 110a. The networked computer environment 100 may also include a server 112 that is enabled to run a recasting repetitive messages program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the recasting repetitive messages program 110a, 110b may interact with a database 114 that may be embedded in various storage devices, such as, but not limited to a computer/mobile device 102, a networked server 112, or a cloud storage service.

According to the present embodiment, a client computer 102 or a server computer 112 may execute instructions of the recasting repetitive messages program 110a, 110b (respectively) to automatically recast a received message, which is determined to be repetitive, by sending the received message back to the sender for revision and/or by altering the presentation of the received message.

The recasting repetitive messages method is explained in more detail below with respect to FIG. 2.

Figure 2:
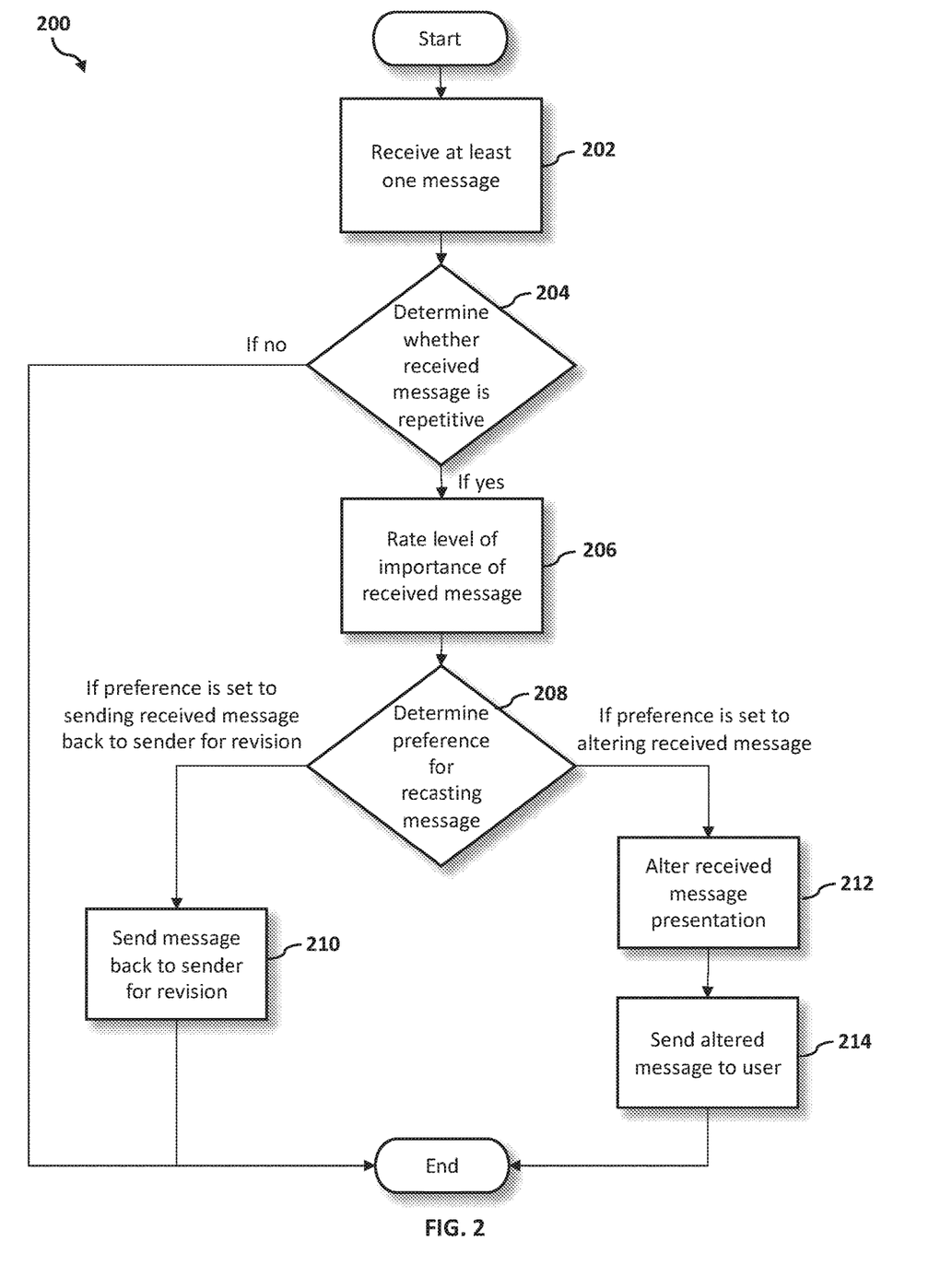
FIG. 2 is an operational flowchart illustrating a process for recasting repetitive messages according to at least one embodiment.

Referring now to FIG. 2, an operational flowchart illustrating the exemplary recasting repetitive messages process 200 used by the recasting repetitive messages program 110a and 110b according to at least one embodiment is depicted. In various embodiments, the operations of the process 200 may be performed by any of the computer 102 or server 112 running the software program 108 and the recasting repetitive messages programs 110a, 110b. In various embodiments, the operations of the process 200 may be included in any of the software program 108 and the recasting repetitive messages programs 110a, 110b.

At 202, a message is received. The received message may be a text message, an email and/or a message on a social media or collaboration communication service (e.g. Slack® (Slack is a registered trademark of Slack Technologies, Inc. in the United States and/or other countries), Skype® (Skype is a registered trademark of Microsoft Corporation in the United States and/or other countries), Facebook® (Facebook is a registered trademark of Facebook, Inc. in the United States and/or other countries)). The sender of the message may be an individual and/or an automated program for a company or an organization. The message may be received on any data processing system or electronic device capable of executing machine-readable program instructions.

At 204, the repetitiveness of the received message is determined.

To determine the repetitiveness of a received message, including repetitive sections and elements within the message, N-grams may be extracted from the received message. An N-gram may be a contiguous sequence of n items from a given sample of text. N-grams may come in different sizes, for example, a bigram has a size of 2 while a trigram has a size of 3. The recasting repetitive messages program 110a, 110b may extract N-grams from the received message as a combination of a certain number of words together in an order such that the message may be built out into a unique phrase. The first N-gram of a message may start with a null space, while the last N-gram of a message may end with a null space. For example, if the received message consists of the sentence, "Please walk the dog." then the N-grams would be [null Please walk], [Please walk the], [walk the dog], and [the dog null]. An N-gram is a more unique sequence than the individual words that make up the N-gram. Extracting this N-gram may give a unique sequence to check for overlap in other messages and may allow the program 110a, 110b to take out the encoding of the language that may be put into the message, such that the N-gram may be used to determine the frequency at which a specific statement within a received message occurs in historical message data.

Structure may be extracted using natural language processing (NLP) techniques to build a grammar tree (e.g., parse tree) for the received message. The grammar tree (e.g., parse tree) may be used in the analysis of the received message to determine repetitiveness, in an alternative or addition to the N-grams technique, by identifying text with a intent and/or content similar to intent or content of messages stored in the historical message database. For example, the recasting repetitive messages program 110a, 110b may identify the phrase "Paul is going to the store." in a received message as having a similar intent to the phrase "Paul went to the store." in a historical message. These statements may be determined to be repetitive by the recasting repetitive messages program 110a, 110b.

Figure 3:
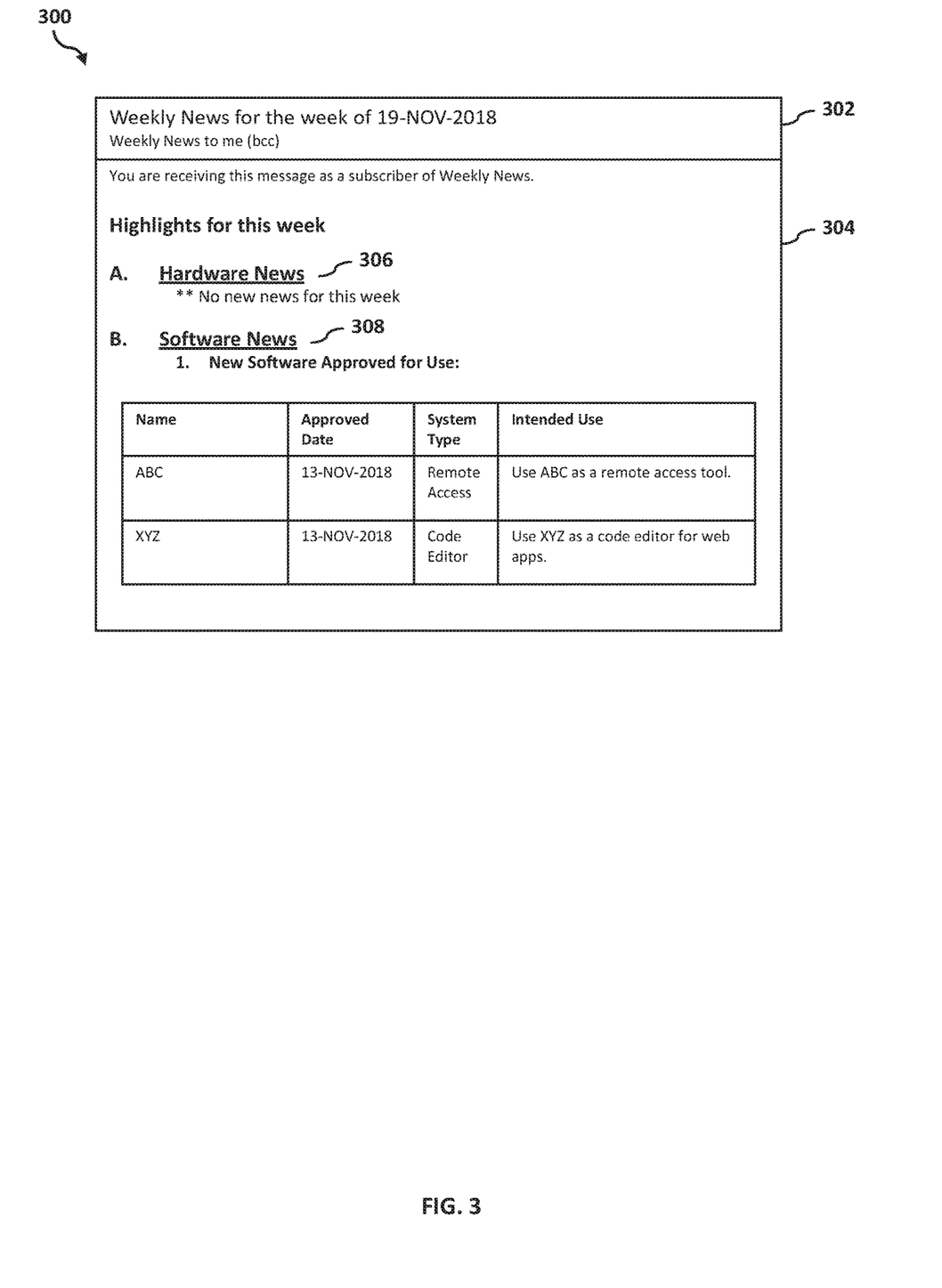
FIG. 3 is an exemplary illustration of a received message according to at least one embodiment.

Sections may be extracted based on color, formatting, and style of a received message. FIG. 3 shows an example of a section. As shown below with reference to FIG. 4, a section determined to be repetitive may be altered. For example, sections may include headings, images, or text formatting found in, among other things, MIME message parts, which may be in HTML format. Elements may be extracted based on paragraphs of a received message. Sections and elements of a received message may be found to be repetitive as compared to sections and elements of messages stored in the historical message database.

The recasting repetitive messages program 110a, 110b may use a dictionary of commonly used words to determine which words may be repetitive, and may then remove the commonly used words (e.g. the, be, to, of, and, a, in, is) from the N-grams when analyzing a received message. Verbs may be changed into the present simple tense (e.g. "danced" becomes "dance" by removing the past participle). For example, an N-gram of [Please walk the dog] becomes [Please walk dog] because "the" is a very common word and can be removed.

The extracted details including the extracted N-grams, the grammar tree, the extracted sections, and the extracted elements of the message data of the received message may be stored in particular type of database or data structure (e.g., knowledge graph or triple store) associated with the message, and in an embodiment, the database or data structure can be stored using Apache Hadoop® and Apache HBase® (Apache Hadoop and Apache HBase are registered trademarks of the Apache Software Foundation in the United States, and/or other countries) with an Apache Spark™ processing engine, which is a network of computers using certain software. In other embodiments, message data stored in the particular type of database or data structure could be stored in any suitable computer.

The user and/or an administrator may set a time period (i.e., time frame) of relevancy for stored historical message data (e.g., data stored in a historical message database such as database 114) for which received messages may be considered repetitive. For example, the user may only want the recasting repetitive messages program 110a, 110b to identify repetitive messages that include repetitive information from the last month. In that case, a received message containing repetitive information received during the last month may be marked as repetitive, whereas a received message which contains repetitive information only when compared to historical message data from two years ago may not be marked as repetitive. For example, if Bob only wants the recasting repetitive messages program 110a, 110b to recast messages that are deemed repetitive as compared to other messages received the same week, then the program 110a, 110b will identify received messages as being repetitive based on a comparison of the received message to stored historical message data of the past week.

The frequency of natural language elements may be calculated by comparing historical message data to the extracted data that may be located in a knowledge graph and/or a triple store associated with the message. The message may then be scored using a lookup table by referencing the triple store being associated with a table which includes a store of occurrences. The triple store may be directly in line with the count (i.e., store) of occurrences. For example, the recasting repetitive messages program 110a, 110b may extract the sentence "Paul goes to the store" into the N-grams [Paul][go to][store] from a received message. The message may then be scored using a lookup table, thereby finding the total number of occurrences in historical message data. In the following example, [Paul] [to go][store] →[Occurrences: 2], the recasting repetitive messages program 110a, 110b may find that there have been two previous occurrences of this N-gram sequence.

If the recasting repetitive messages program 110a, 110b determines that a received message is repetitive, the recasting repetitive messages program 110a, 10b continues to step 206 below. The repetitive determination may be based on statistical techniques to calculate a frequency, a relative frequency, and a standard deviation of the frequency. As an example, if two occurrences may be average for a received message and the current repetition is five occurrences for a particular received message, then the frequency may exceed two standard deviations and the received message may be determined to be repetitive. If, however, the received message is determined not to be repetitive (e.g., the frequency does not exceed two standard deviations), then the recasting repetitive messages program 110a, 110b ends.

At 206, the level of importance of the received message is measured. The received message may be scored for the level of importance based on the words and language included in the message. A database of word associations and grammar (e.g., database 114) indicating importance may be used to identify the level of importance of the message to the user. For example, a message containing the word "must" and the word "tomorrow" in the same sentence may score a high level of importance. As another example, a message may only contain the word "tomorrow" may score a moderate level of importance.

At 208, the preference for recasting the received message is determined. The user or the administrator may set a preference for whether the message may either be sent back to the sender for revision or the presentation of the message may be altered, and the altered message may be sent to the user. This preference may be based on the repetitiveness of the received message and the level of importance of the received message. For example, if John only wants repetitive messages that are also rated as important to be sent back to the sender for revision then if he receives a message that the recasting repetitive messages program 110a, 110b determines to be repetitive with a high level of importance, the program 110a, 110b will then send the received message back to the sender asking for revision to make the message less repetitive for John.

At 210, the message is sent back to the sender for revision. In this case, the received message may have been determined to be repetitive, as compared to other messages received by the user, so the received message may have been sent back to the sender to allow for revision by the sender and to make the received message less repetitive and more customized. For example, Sally may receive a message saying, "Please look over these documents." from John. If Sally has received three other emails similar to this received message in one day, the recasting repetitive messages program 110a, 110b may mark the received message from John as repetitive. Since Sally has set her preference to send the received repetitive messages back to the sender for revision, the program 110a, 110b may send this message back to John and ask him to revise the message to be less repetitive for Sally. John can then revise and add details to the message. He might then say, "Hello Sally. Can you please look over these project funding documents that I have attached? Thanks." and send this back to Sally as it is no longer repetitive.

At 212, the presentation of the message is altered to be less formulaic. The received message may have been found to be repetitive as compared to other messages received by the user so the recasting repetitive messages program 110a, 110b may perform various operations to alter the presentation of the received message to emphasize any important and new information. For example, Sally may receive a weekly newsletter each week that is found to be repetitive, but also has new and important information in it. Sally may have set her preferences to indicate that received messages that are repetitive with a high level of importance are recast by altering the presentation of the message. When she receives this newsletter, instead of sending the newsletter back to the sender, the program 110a, 110b alters the message presentation. The program 110a, 110b alters the received message to be less formulaic and emphasizes the new information in the message instead of the repetitive information.

A sign off may be injected at the end of the message for the new details and may be based on a determined importance. For example, the altered message may include a sign off at the end of the message saying, "I have read this message." The user may click the sign off to acknowledge that the user has read the message and has seen the new information.

A vote on the new elements in the message may be added. For example, in the altered message, an [Up Vote]/[Down Vote] option may be added to the new elements in the message. The up vote or down vote may indicate an agreement or a disagreement, respectively, to the newly added elements, and may further indicate that there may be an action related to the paragraphs or elements that are repetitive or altered.

A quiz based on the information that is not formulaic may be added to the recast (i.e., altered) message and may require user input. For example, after a paragraph of nonrepetitive information, Fred may answer the question "Do you need to take action? [Yes/No]" before moving on to the rest of the message.

A summarization of the nonrepetitive information may be included. The summarization may be presented as an animation which moves between the new elements which are being highlighted. For example, a summarization of the new details may be added for each new element.

The message may be split into sub messages which may be independently delivered. The message may be split into sub messages based on the length of the received message and paragraph boundaries in the received message. These sub messages may be independently delivered to the user depending on a user and/or administrator preference (e.g. the recipient, administrator, or sender can determine a preference).

The nonrepetitive elements and sections of a recast (i.e., altered) message may be highlighted in a presentation layer. The presentation layer may fade out the repetitive layers (i.e., one or more pieces of repetitive information) and may require user action before revealing the elements which are repetitive. For example, the recasting repetitive messages program 110a, 110b may emphasize the new information by fading the repetitive information so the user cannot read the repetitive information. The user may have to click on the faded sections of the message to reveal the repetitive information that is obscured in the altered presentation. Once the user clicks on the obscured parts of the message, the user will be able to clearly read the repetitive sections.

The addition of alterations which may include a sign off, vote, quiz, summarization, splitting the message into two or more subsections, or highlighting may be based on the level of importance of the message as rated by the recasting repetitive messages program 110a, 110b. For example, a message that may have been rated with a high importance level may include a sign off at the end of the altered message. The user may click the sign off to acknowledge they have read the message and have seen the information with a high level of importance.

At 214, the altered message is sent to the user. The altered message may have one or more of the previous presentation alternatives which may include a sign off, a vote, a quiz, a summarization, one or more sub messages, and/or new information highlighted in a presentation layer.

Referring now to FIG. 3, an exemplary illustration of a message received by the recasting repetitive messages program 110a and 110b is depicted.

A received message 300 may be received by a user of the recasting repetitive messages program 110a, 110b. For example, Fred, a user of the recasting repetitive messages program 110a, 110b, may receive a Weekly News email each week at work that looks like message 300.

At 302, the subject line of the message is illustrated. For example, the message 300 shows the title 302 of Weekly News for the week of 19 Nov. 2018.

At 304, the body of the email message is illustrated. One section of the received message 306, showing Hardware News for the week, is illustrated. Another section of the received message 306, showing Software News, is also illustrated. For example, Fred may receive message 300 containing one section 306 that shows Hardware News and another section 308 that shows Software News in the body of the email message 304.

Figure 4:
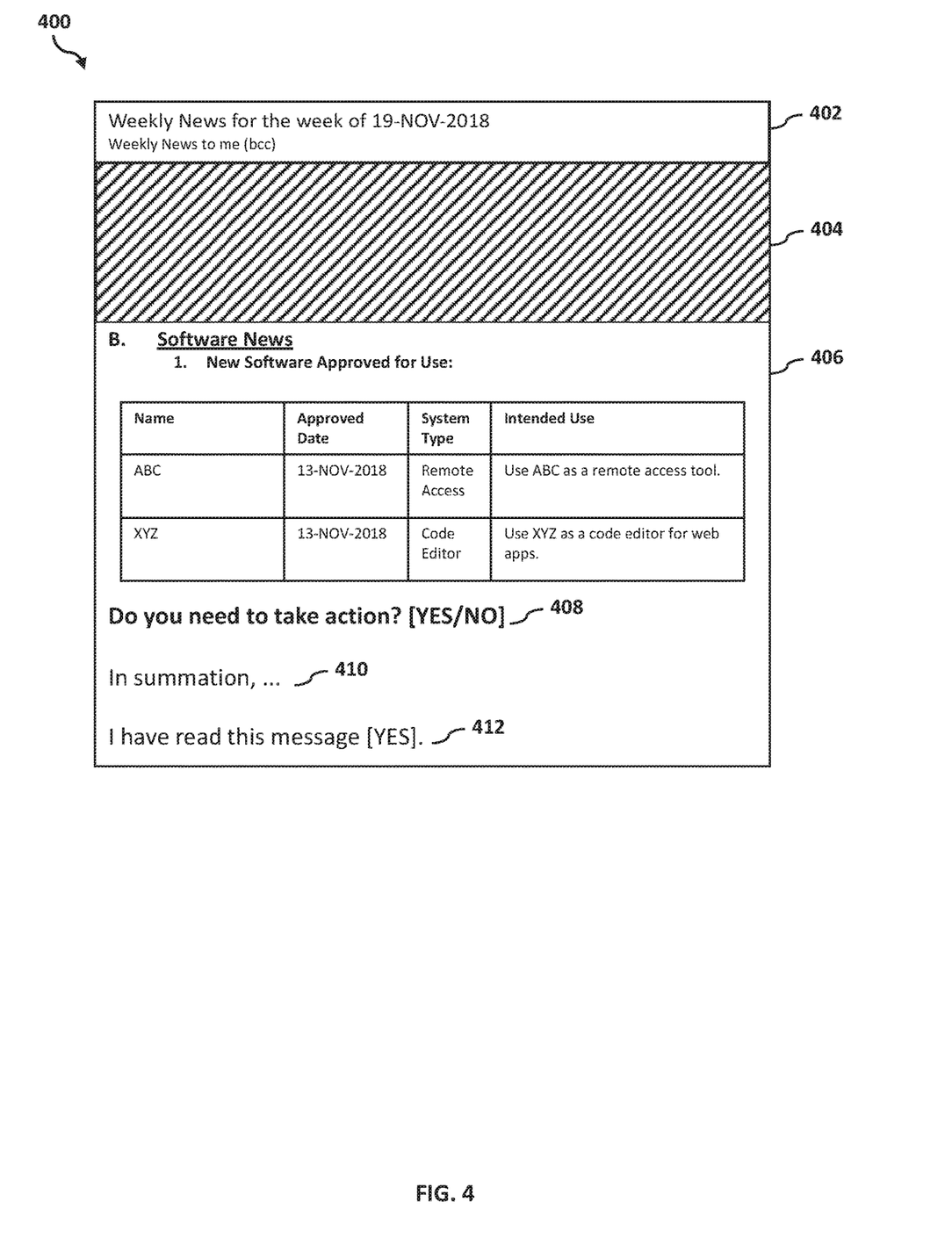
FIG. 4 is an exemplary illustration of an altered message according to at least one embodiment.

Referring now to FIG. 4, an exemplary illustration of an altered message sent by the recasting repetitive messages program 110a and 110b is depicted.

An altered email (i.e., message) 400 may be sent by the recasting repetitive messages program 110a, 110b. For example, Fred may receive message 300, as described previously with respect to FIG. 3 above, and the recasting repetitive messages program 110a, 110b may determine that the received message is repetitive and may alter the received message 300 and may send an altered message 400 to Fred.

A subject line 402 of the altered message is illustrated. For example, the altered message 400 shows the subject line (i.e., title) 402 of Weekly News for the week of 19 Nov. 2018.

Repetitive information 404 may be detected by the recasting repetitive messages program 110a, 110b and the presentation of the received message 300 may be altered by obscuring the repetitive information 404. For example, because there was no new Hardware News 306 the recasting repetitive messages program 110a, 110b altered the presentation by obscuring that information as it found it to be repetitive. Specifically, the phrase "no new news for this week" was determined to be repetitive at operation 204 of process 200.

Nonrepetitive information 406 is also illustrated. For example, the recasting repetitive messages program 110a, 110b may have found the information in section 308 of the received message 300 to be nonrepetitive, so the recasting repetitive messages program 110a, 110b did not obscure or otherwise alter this nonrepetitive information.

A quiz 408 based on the nonrepetitive information is also illustrated. For example, the recasting repetitive messages program 110a, 110b may have determined that the information in section 308 was not formulaic, so the recasting repetitive messages program 110a, 110b altered the message presentation by adding a quiz asking Fred, the user, "Do you need to take action?"

A summarization of the message 410 is also illustrated. For example, the recasting repetitive messages program 110a, 110b may have determined that the information in section 308 included new elements, so the recasting repetitive messages program 110a, 110b altered the message presentation by adding a summarization of the received message.

A sign off 412 for the message is also illustrated. For example, the recasting repetitive messages program 110a, 110*b* may have determined that the information in section 308 included new elements, so the recasting repetitive messages program 110*a*, 110*b* altered the message presentation by adding a sign off stating, "I have read this message [YES]." for Fred to acknowledge at the end of the message for the new elements.

It may be appreciated that FIGS. 2 through 4 provide only an example illustration of how one embodiment may be implemented and does not imply any limitations with regard to how different embodiments may be implemented. Many modifications to the depicted embodiment(s) may be made based on design and implementation requirements.

Figure 5:
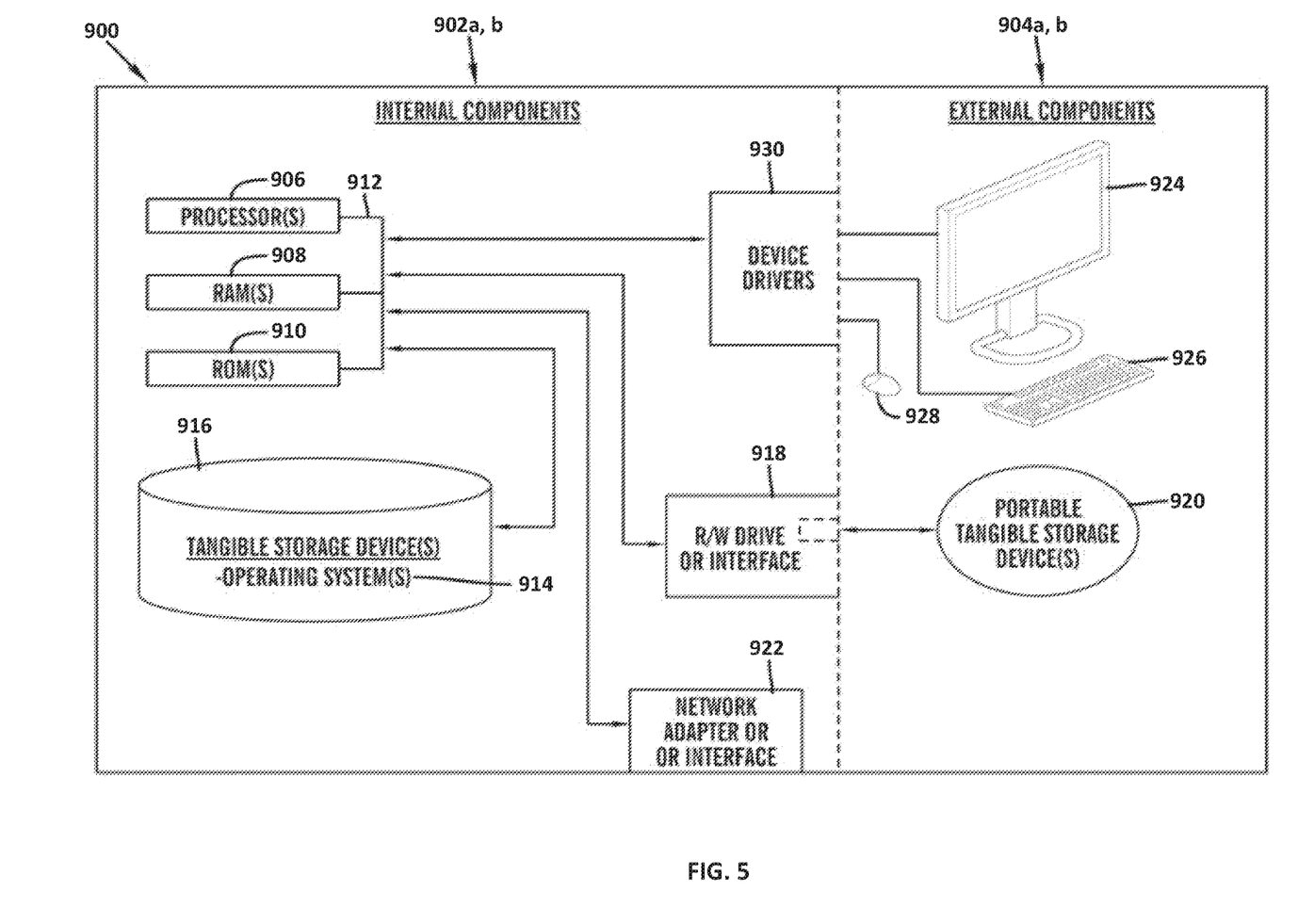
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902*a, b* and external components 904*a, b* illustrated in FIG. 5. Each of the sets of internal components 902*a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the recasting repetitive messages program 110*a* in client computer 102, and the recasting repetitive messages program 110*b* in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902*a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the recasting repetitive messages program 110*a* and 110*b* can be stored on one or more of the respective portable computer-readable tangible storage devices 920, read via the respective R/W drive or interface 918 and loaded into the respective hard drive 916.

Each set of internal components 902*a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the recasting repetitive messages program 110*a* in client computer 102 and the recasting repetitive messages program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the recasting repetitive messages program 110*a* in client computer 102 and the recasting repetitive messages program 110*b* in network server computer 112 are loaded into the respective hard drive 916. The network may comprise copper wires, optical fibers, wireless transmission, routers, firewalls, switches, gateway computers and/or edge servers.

Each of the sets of external components 904*a, b* can include a computer display monitor 924, a keyboard 926, and a computer mouse 928. External components 904*a, b* can also include touch screens, virtual keyboards, touch pads, pointing devices, and other human interface devices. Each of the sets of internal components 902*a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
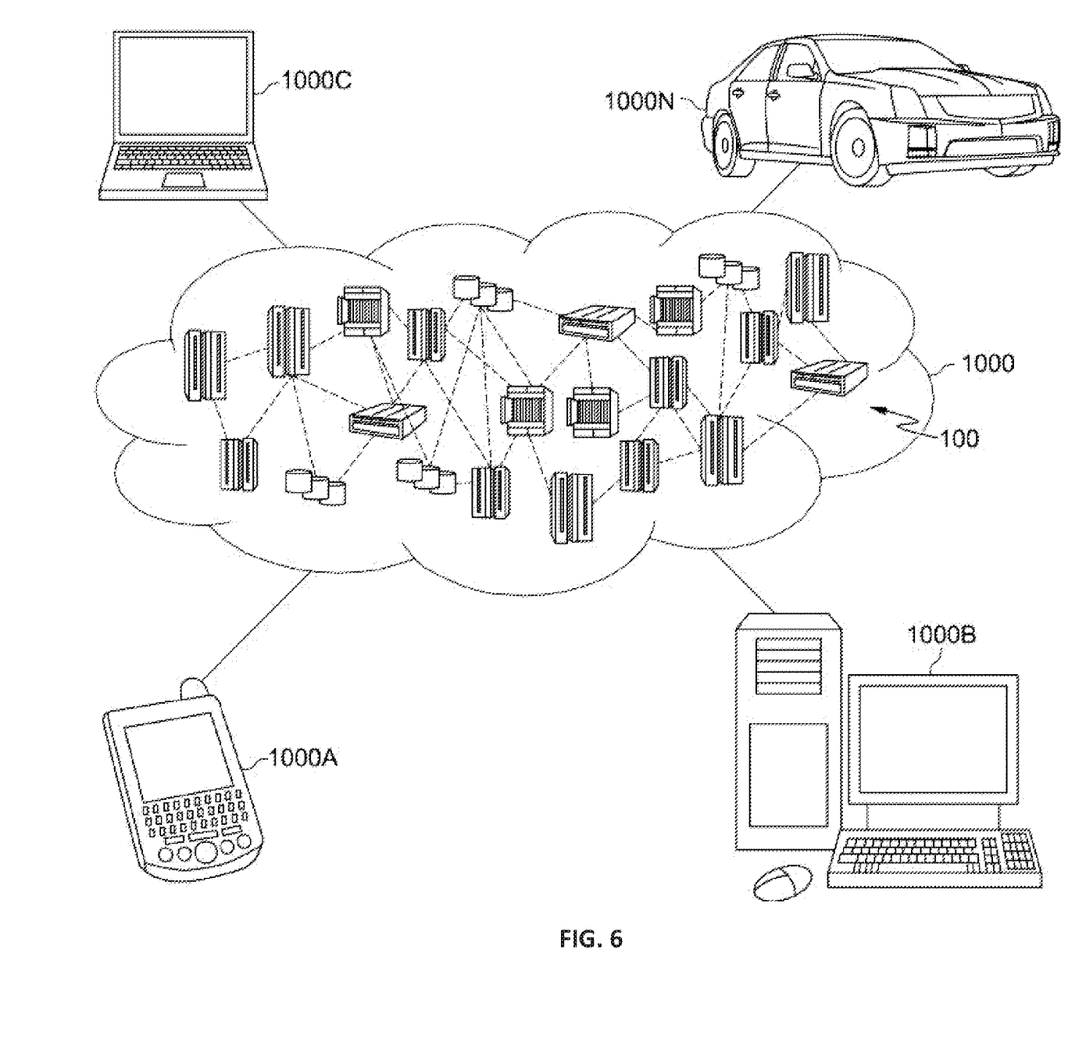
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
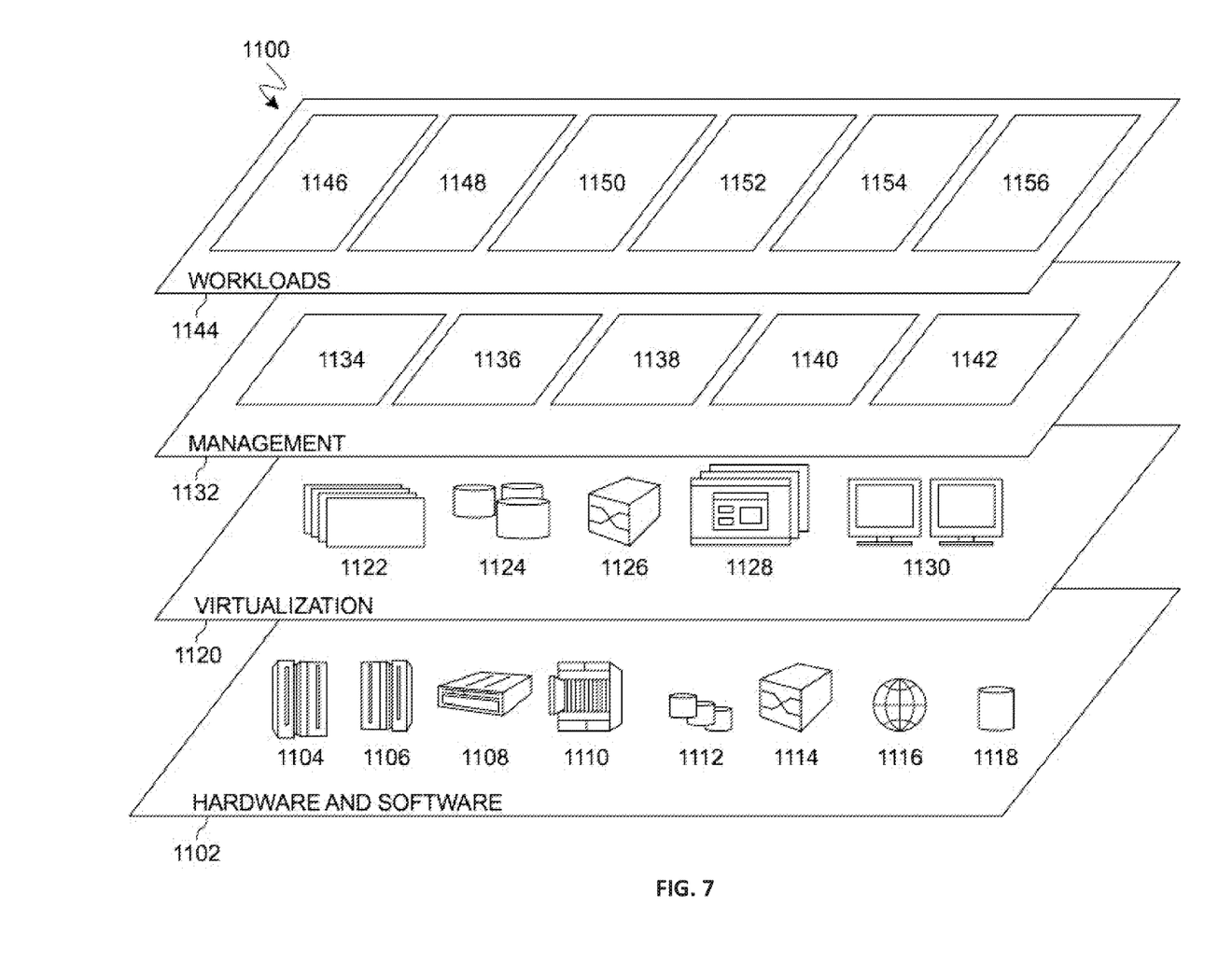
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and recasting repetitive messages 1156. A recasting repetitive messages program 110a, 110b provides a way to automatically recast a received message, which is determined to be repetitive, by sending the received message back to the sender for revision and/or by altering the presentation of the received message.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recasting repetitive messages, the method comprising:
   receiving, by a processor, a message;
   determining, by the processor, whether the received message is repetitive, determining whether the received message is repetitive including extracting data from the received message and storing the extracted data in a knowledge graph or a triple store when comparing the extracted data to stored historical message data;
   rating, by the processor, an importance level of the received message; and
   determining a preference for recasting the received message,
   wherein comparing the extracted data to stored historical message data is performed using a lookup table in a specified timeframe to generate a frequency score of extracted data using, the generated frequently score used to determine a repetitiveness of the extracted data.

2. The method of claim 1, wherein the extracted data includes an N-gram, or a contiguous sequence of n items from the received message, extracted as a combination of a certain number of words in an order which builds a unique phrase.

3. The method of claim 2, further comprising:
   using a dictionary of commonly used words to determine that a word is repetitive; and
   removing the repetitive word from the N-gram.

4. The method of claim 1, wherein a structure of the received message is extracted using natural language processing (NLP) techniques to build a grammar tree for the received message, and wherein the grammar tree is used in an analysis of the received message to determine whether the received message is repetitive.

5. The method of claim 1, wherein determining whether the received message is repetitive further comprises:
   using statistical techniques to calculate a frequency, a relative frequency, and a standard deviation of the frequency.

6. A computer system for recasting repetitive messages, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by a processor, a message;
   determining, by the processor, whether the received message is repetitive;
   rating, by the processor, an importance level of the received message; and
   determining a preference for recasting the received message,
   wherein a structure of the received messages is extracted using natural language processing (NLP) techniques to build a grammar tree for the received message, and wherein the grammar tree is used in an analysis of the received message to determine whether the received message is repetitive.

7. The computer system of claim 6, wherein the determining whether the received message is repetitive or not further comprises:
   extracting data from the received message and storing in a memory the extracted data in a knowledge graph or a triple store associated with the received message; and
   comparing the extracted data to stored historical message data.

8. The computer system of claim 7, wherein the comparing the extracted data to stored historical message data further comprises:
   using a lookup table to perform the comparison, wherein the comparison is performed for a specified time frame provided by a user;
   generating a frequency score of extracted data by referencing the triple store, wherein the triple store is associated with a store of occurrences; and
using the generated frequency score to determine a repetitiveness of the extracted data.

9. The computer system of claim 7, wherein the extracted data includes an N-gram, or a contiguous sequence of n items from the received message, extracted as a combination of a certain number of words in an order which builds a unique phrase.

10. The computer system of claim 9, further comprising:
    using a dictionary of commonly used words to determine that a word is repetitive; and
    removing the repetitive word from the N-gram.

11. The computer system of claim 6, wherein determining whether the received message is repetitive further comprises:
    using statistical techniques to calculate a frequency, a relative frequency, and a standard deviation of the frequency.

12. A computer program product for recasting repetitive messages, comprising:
    one or more computer-readable storage media and program instructions stored on at least one of the one or more tangible storage media, the program instructions executable by a processor to cause the processor to perform a method comprising:
    receiving, by a processor, a message;
    determining, by the processor, whether the received message is repetitive or not;
    rating, by the processor, the level of importance of the received message; and
    determining the preference for recasting the received message,
    wherein a structure of the received messages is extracted using natural language processing (NLP) techniques to build a grammar tree for the received message, and wherein the grammar tree is used in an analysis of the received message to determine whether the received message is repetitive.

13. The computer program product of claim 12, wherein the determining whether the received message is repetitive or not further comprises:
- extracting data from the received message and storing in a memory the extracted data in a knowledge graph or a triple store associated with the received message; and
- comparing the extracted data to stored historical message data.

14. The computer program product of claim 13, wherein comparing the extracted data to stored historical message data further comprises:
- using a lookup table to perform the comparison, wherein the comparison is performed for a specified time frame provided by a user;
- generating a frequency score of extracted data by referencing the triple store, wherein the triple store is associated with a store of occurrences; and
- using the generated frequency score to determine a repetitiveness of the extracted data.

15. The computer program product of claim 13, wherein the extracted data includes an N-gram, or a contiguous sequence of n items from the received message, extracted as a combination of a certain number of words in an order which builds a unique phrase.

16. The computer program product of claim 15, further comprising:
- using a dictionary of commonly used words to determine that a word is repetitive; and
- removing the repetitive word from the N-gram.

\* \* \* \* \*